June 17, 1958
K. E. WILHELM
2,839,138
INTERMITTENT FEED MECHANISM
Filed Aug. 6, 1952
3 Sheets-Sheet 2
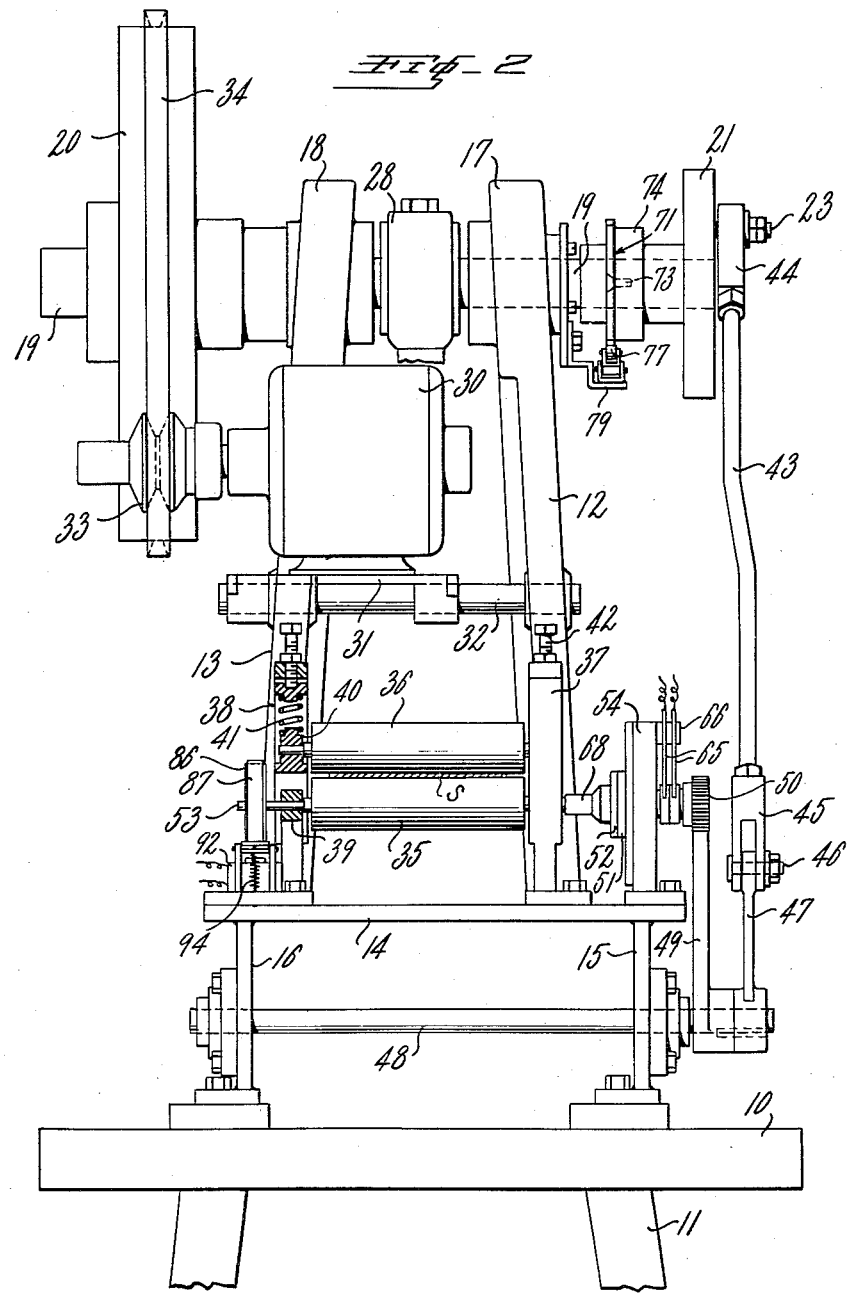
INVENTOR.
KURT E. WILHELM
BY Charles C. Willson
ATTORNEY

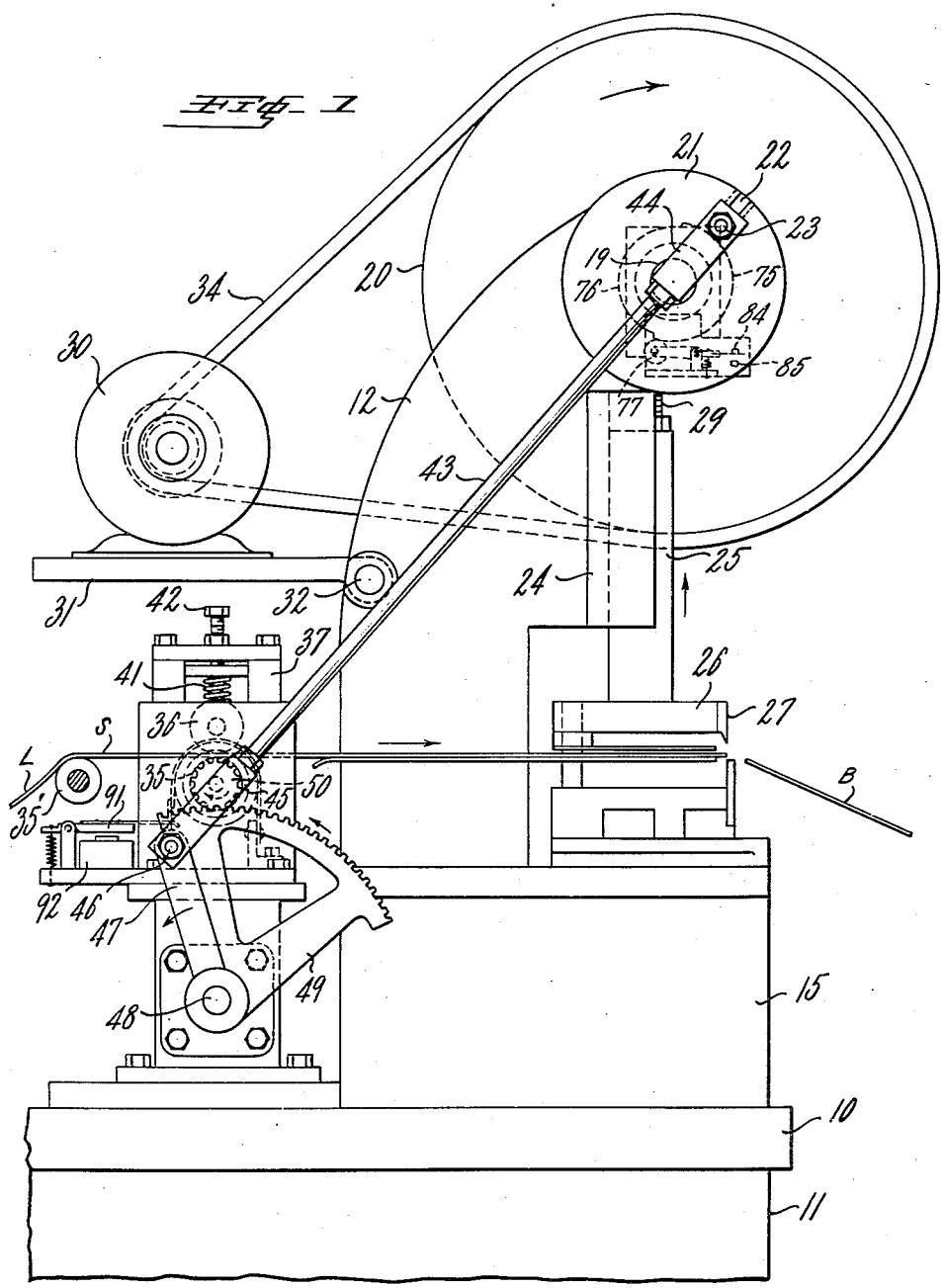

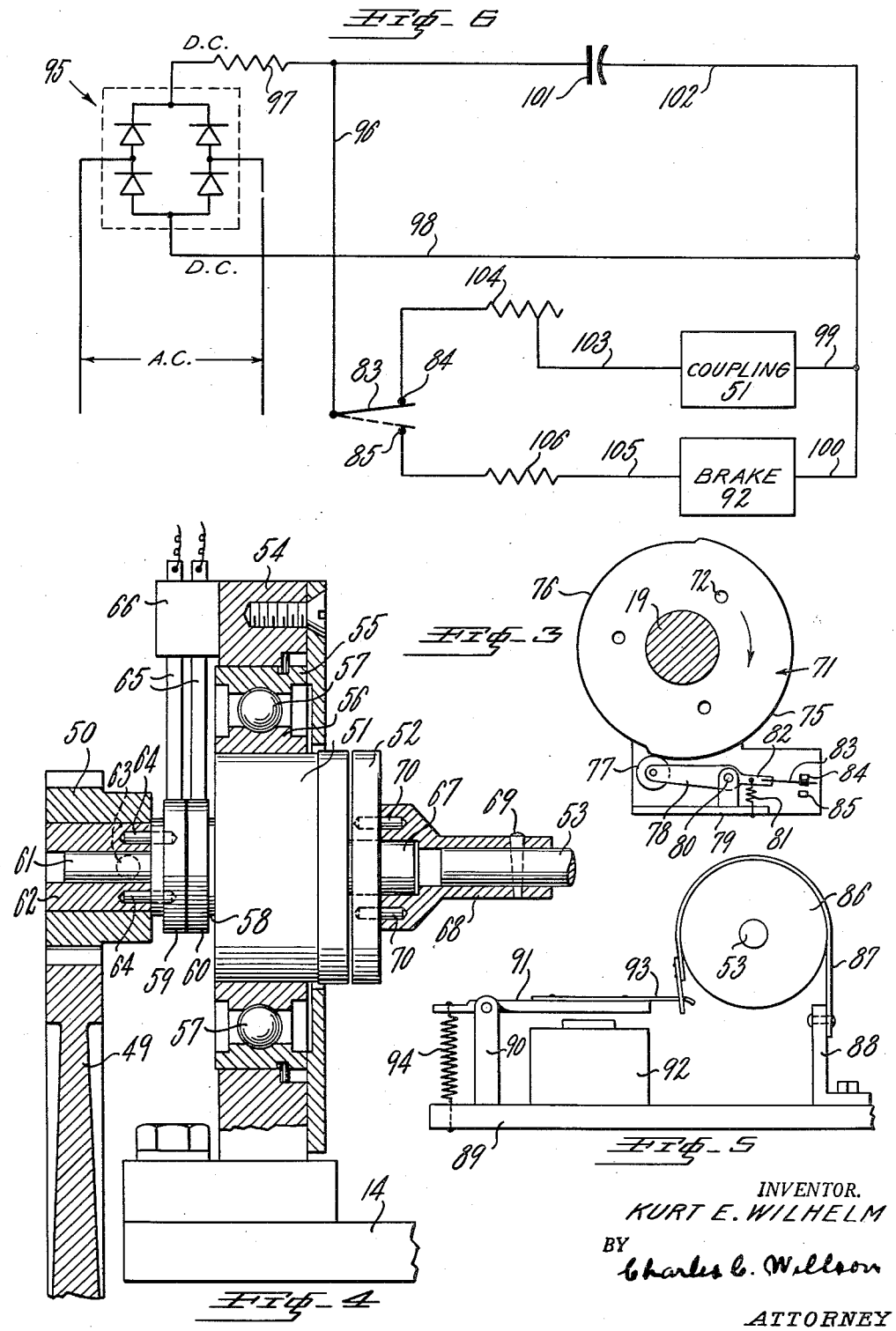

United States Patent Office 2,839,138
Patented June 17, 1958

2,839,138

INTERMITTENT FEED MECHANISM

Kurt E. Wilhelm, Warren, R. I., assignor to United States Rubber Company, New York, N. Y., a corporation of New Jersey Application August 6, 1952, Serial No. 302,933

9 Claims. (Cl. 164—49)

This invention relates to intermittent feed mechanism adapted to be operated from reciprocating mechanism to impart an intermittent rotative movement to feed means, and more particularly to means for accurately synchronizing the intermittent rotation of such feed means to the high speed movement of the reciprocating mechanism.

The intermittent feed mechanism of the present invention may be employed in various fields where the movement of reciprocating mechanism is employed to rotate intermittently a roller or the like, but it is particularly well adapted for use in combination with a reciprocating cutter, where an intermittent rotating roller is used to feed stocks step-by-step to the reciprocating cutter to be cut thereby at high speed into uniform lengths.

Reciprocating mechanism such as reciprocating cutters have been employed heretofore to operate feed means intermittently so as to advance stock step-by-step to the cutter, but if the cutter reciprocates at high speed and its rapid movement is employed to rotate a feed roller intermittently to advance stock to the cutter, it is difficult to synchronize the movement of the cutter and roller so that the roller will repeatedly advance just the right length of stock to the cutter, without under- or over-advancing the stock. This difficulty is due to the fact that when the roller is turned quickly through an angle it will tend to overrun because of its momentum, and if a brake is used to prevent the roller from overrunning then the added brake load that opposes the rotation of the roller makes it hard to turn. These difficulties increase as the speed at which the cutter is reciprocated increases.

The present invention overcomes these difficulties and provides a simple, practical and inexpensive connection between a rapidly reciprocating cutter and an associated feed roller to operate the roller intermittently from the cutter, so that the roller does not overrun even when operated at high speed. The intermittent feed mechanism of the present invention makes it possible to operate a reciprocating cutter for cutting flat stock or bars into short lengths at high speed, and to drive a feed roller intermittently from such cutter, so that the roller will advance to the cutter at high speed just the right length of stock it is desired to cut at each stroke.

In carrying out the present invention, the reciprocating cutter may be operated from a rotating shaft carrying a fly wheel, and this rotating shaft is preferably provided with an eccentric having a connecting rod secured thereto so that as the shaft rotates it will reciprocate the rod. The other end of such rod is operatively connected to a gear segment, so that as the shaft rotates it will rock this gear segment back and forth through a substantial arc. This gear segment may mesh with a small gear so that as the segment is advanced in one direction it will turn this gear to the right and as the segment moves in the opposite direction it will turn such gear to the left. The purpose of this gear is to turn a feed roller in the stock advancing direction but not in the reverse direction. This one-way turning of the roller can be secured by employing operating pawls between the gear and roller, but if such pawls are used the gear may turn slightly before the pawls impart any movement to the roller, and if this mechanism is operated at high speed the roller may tend to overrun relative to the pawls as the gear segment approaches the end of its forward movement.

In carrying out the present invention, most of the mechanism just described may be employed, but instead of using pawls or the like to impart a one-way turning movement to the feed roller, an electrical grab coupling is used betweeen the gear and feed roller that feeds stock to the cutter. This coupling, used in carrying out the present invention, is so constructed that it positively locks the gear and roller together so that one cannot turn relatively to the other so long as electric energy is supplied to the coupling, and the moment this energy is cut off the gear is released to turn independently of the roller. The clutch is electrically controlled from the rotating shaft that operates the cutter.

This electric coupling works in a highly satisfactory manner as it involves no time delay, and if the connecting rod which rocks the gear segment is operated from the cutter by an eccentric, the oscillating gear segment will come momentarily to a dead stop at each end of its stroke. This is desirable in the present construction because when the gear which is rotated back and forth by the gear segment is positively locked to the roller by the electric coupling throughout the feeding stroke the gear and roller will rotate together, and this mechanism will accelerate and decelerate the roller with the gear movement to thereby prevent overrunning of the roller when the parts are operated at high speed. The operation is such that the reciprocating gear segment comes momentarily to a dead stop at each end of its stroke and the roller is likewise brought to a dead stop after advancing the stock. This prevents overrunning.

During the reverse movement of the gear segment the gear, due to the released coupling, is free to turn independently of the roller, and in order to prevent the roller from being accidentally turned at this time by the machine vibration, for example, it is desirable to associate with such roller a holding brake which will be inactive throughout the forward turning movement of the roller but will be active throughout the reverse movement of the gear segment. This brake mechanism is preferably electrically controlled and the electrical arrangement is such that electric energy will be supplied to the grab coupling, above mentioned, throughout the forward movement of the gear segment, and will be supplied to the electric brake to apply this brake throughout the rearward movement of such segment. As a result of this construction there is no possibility of the brake working against the coupling.

The reciprocating cutter and intermittent feed mechanism operated from the cutter contemplated by the present invention, may be employed for various purposes but was developed for use in the manufacture of battery separators formed of resin treated fiber stock. These separators are made by embossing and heat treating a continuous length of sheet stock, and then the treated advancing sheet is fed intermittently to the cutter and cut into battery separators at high speed.

The above and other features of the present invention will be further understood from the following description when read in connection with the accompanying drawings wherein:

Fig. 1 is a side view of a machine embodying the present invention and provided with a reciprocating cutter and intermittent feed mechanism for advancing the stock step-by-step to the cutter;

Fig. 2 is a face view with parts in section of the machine shown in Fig. 1;

Fig. 3 is a transverse sectional view through the power shaft of Fig. 1 showing the switch operating cam;

Fig. 4 is a face view with parts in section of an electrically operated grab coupling employed for intermittently rotating a feed roller;

Fig. 5 is a view of electrically operated brake means for holding the feed roller from turning; and Fig. 6 is a diagram of the electrical connections for controlling the electrically actuated grab coupling and electrically applied brake.

The present invention relates to apparatus or a machine having power operated reciprocating mechanism, such as a reciprocating cutter, and feed means such as an intermittently turned roller for advancing stock step-by-step to the reciprocating cutter, to thereby cut the stock into short uniform lengths. The features of the present invention may be employed in various fields where it is desired to feed stock step-by-step to reciprocating mechanism, but the present invention was developed primarily for use in cutting a continuous length of embossed, resin-impregnated fibrous sheet into short lengths to form battery separators, and will be herein described as employed to produce such battery separators.

Now referring to the drawings, the machine shown is conveniently mounted upon a table 10 which is supported at a desired height from the floor by the legs 11. On this table is mounted the machine frame formed of the spaced uprights 12 and 13, the lower ends of which are bolted to a base plate 14 having the spaced downwardly extending flanges 15 and 16 that are bolted to the table 10. The uprights 12 and 13 are provided at their upper ends with the rounded portions 17 and 18 in which are provided bearings for the rotating shaft 19. This shaft has mounted thereupon near its left-hand end, viewing Fig. 2, the fly wheel 20, and to the opposite end of this shaft is secured the eccentric disk 21 having a radially extending slot 22 formed in its outer face. A T-bolt 23 is adjustably mounted in this slot.

The uprights 12 and 13 are provided with the vertical flanges 24 which form a slide-way for the reciprocating member 25 which is provided at its lower end with the head 26 to which the cutter 27 is secured. Reciprocating movement is imparted to the member 25 by an eccentric or offset portion upon the shaft 19 and which operates in the eccentric head 28 that is connected by a shaft 29 to the member 25 to reciprocate the cutter 27 when the shaft 19 is rotated.

In the construction shown the fly wheel 20 and shaft 19 are rotated by an electric motor 30 which is mounted upon the platform 31 that is pivotally secured at 32 to the uprights 12 and 13. This motor has secured to its motor shaft the adjustable pulley 33 adapted to receive and drive a V-belt 34 which engages and drives the fly wheel 20 as shown. The arrangement is such that the weight of the motor serves to tension this belt, and the speed at which the shaft 19 is rotated can be varied to some extent by adjusting one head of the pulley 33 towards or from the other to vary the width of the slot that receives the V-belt 34. The direction in which the fly wheel 20 is rotated by the motor 30 is indicated by an arrow in Fig. 1.

The cutting mechanism so far described is capable of operating at high speed, the upper limit for its speed of operation depends upon the rate at which the stock to be cut can be fed step-by-step to the cutter without over-feeding or under-feeding the same. Since the feed means for the stock operates intermittently by starting, moving rapidly and stopping, for each cutting stroke, the tendency for the intermittent feed means to over-feed or under-feed increases as the speed of operation increases.

The present invention, as above stated, relates to intermittent feed mechanism that is operated from reciprocating means such as a reciprocating cutter, and is capable of being operated at high speed without over-feeding or under-feeding the stock. This makes it possible to operate the reciprocating cutter at a much higher speed than has been practical heretofore and still cut the intermittently fed stock into short uniform lengths. The mechanism of the present invention for operating the intermittent feed means from the rotating shaft 19 and for synchronizing the feeding movement with the reciprocating movement of the cutter will now be described.

The stock to be cut into short lengths, such as a continuous strip S of embossed fibrous sheet material that has been impregnated with a resin and then heated to set the resin, may be advanced directly from the heating means to the cutting mechanism of the present invention. The sheet S is advanced continuously at a uniform rate from the heating means, and is advanced intermittently to the cutter 27, but this is readily taken care of by providing a loop in the stock S as indicated by L in Fig. 1, where this stock is shown as passing upwardly over a supporting roller 35′. This stock then moves horizontally between the nip of the lower rubber covered feed roller 35 and upper rubber covered roller 36 that pushes the stock forward to the cutter 27. These rollers are rotatably supported by the uprights 37 and 38. The lower roller is supported in fixed bearings 39. The upper roller is supported in vertically moving bearings 40 that are urged downwardly by the coil springs 41. The tension of these springs may be varied by adjusting the adjustable screws 42 positioned at the upper end of the uprights 37 and 38. The upper roller 36 is free turning. The lower roller 35 is power driven, in a manner to be described. The force with which these rollers grip the stock S can be varied by adjusting the bolts 42.

The stock S is advanced intermittently to the cutter in the direction indicated by the arrow in Fig. 1 by periodically rotating the roller 35 in the stock advancing direction but not in the reverse direction. Such roller is rotated in this manner in the construction shown, from the rotating shaft 19 by a connecting rod 43, the upper end of which is provided with a connecting head 44 that is secured to the eccentric 21 by the bolt 23. This bolt may be adjusted towards and from the axis of the eccentric to vary the length of stroke imparted to the connecting rod 43. The opposite end of this rod 43 is provided with a head 45 that is connected by a bolt 46 to the segment actuating arm 47 that is rigidly secured to a rocking shaft 48 journalled in the brackets 15 and 16. The shaft 48 has rigidly secured thereto adjacent the arm 47 the gear segment 49, the teeth of which engage and rotate a gear 50. The arrangement is such that as the shaft 19 rotates it will reciprocate the connecting rod 43 and this will rock the gear segment 49 back and forth to rotate the gear 50 first in one direction and then the other. The gear 50 serves to rotate the stock feeding roller 35 in the stock advancing direction, but does not rotate this roller in the reverse direction. This one-way rotation of the roller 35 is secured by providing between the gear 50 and the roller an electrically operated grab coupling, comprising the coupling housing 51 and coupling disk or armature 52. The former is connected to the gear 50 to be rotated back and forth thereby, whereas the latter is connected to the roller supporting shaft 53 which is rigidly secured to and supports the roller 35.

The grab coupling housing 51 is rotatably mounted in a supporting frame 54 bolted to the base plate 14, and this housing is supported by the anti-friction bearing shown in Fig. 4. This bearing comprises an outer ring 55 that is rigidly secured to the frame 54, and an inner ring 56 that is tightly secured to the housing 51. Between these two rings are provided the anti-friction balls 57. The gear 50 which is rotated back and forth by the gear segment 49 is rigidly secured to and is supported by the housing 51 so that the two rotate together. To this end the housing 51 has extending laterally therefrom the integral boss 58 on which are mounted the slip rings 59 and 60, and this boss is provided with a small shaft 61 on which the gear 50 is mounted through its bushing 62. The gear 50 is rigidly secured to the shaft 61 by the set screw 63 that is screwed into the reduced body portion of the gear. This gear is further rigidly connected to the boss 58 by the pins 64.

The grab coupling housing 51 has provided therein 5 electromagnets, not shown, which are supplied with electric energy from the slip rings 59 and 60 and brushes 65 carried by the supporting block 66 secured to the frame 54. The housing 51 has projecting from its opposite face the integral boss 67 which serves to rotatably support the disk or armature 52. This disk is so supported that it may move slightly relative to the adjacent face of the housing 51. The arrangement is such that when the electromagnets within the housing 51 are excited they will pull the disk 52 firmly against the face of the housing 51 to positively lock one to the other, so that as long as operating current is supplied to these electromagnets relative movement between the members 51 and 52 is prevented. As soon as the current supplied to such electromagnets is cut off the disk 52 will be released so that the housing may be rotated without rotating such disk. The disk 52 is operatively connected to the shaft 53 by a coupling sleeve 68, and this sleeve is rigidly secured to the shaft 53 by the transversely extending pin 69. This sleeve is coupled to the disk 52 by the pins 70 which permit the disk to move slightly in an axial direction.

When the main shaft 19 is driven by the motor 30 to operate the cutter 27, the connecting rod 43 will be operated as described to move the gear segment 49 back and forth, and this will rock the gear 50 first in one direction and then the other. If the grab coupling housing 51 is supplied with operating current the disk 52 will be pulled thereagainst and the rotative movement imparted to the housing 51 will be imparted to the disk 52 and feed roller 35. On the other hand if the operating current to the housing 51 is cut off the rotation of this housing will not turn the disk 52 or roller 35.

The stock S to be cut into short lengths by the reciprocating cutter 27 is fed forward step-by-step and the feeding means for this stock S should be so operated that the stock will be advanced while the knife operating head is elevated, and will be held against movement during the cutting stroke. In order to accomplish this when the electrically operated grab coupling mechanism above described is used it is necessary to synchronize accurately the supply of electric energy to the electromagnets in the housing 51 with the angular rotation of the operating shaft 19, so that the feed roller 35 will be rotated by the movement of the gear segment 49 in a left-hand direction, viewing Fig. 1, but will not be turned by the movement of this segment in the right-hand direction. This desired control of the operating current to the housing 51 is secured by employing a disk-like cam 71 constructed as best shown in Fig. 3. This cam is rigidly secured to the shaft 19 by screw-holes 72 in the cam and screws 73 that secure the cam to a collar 74 that is secured to the shaft 19. This cam 71 has an arcuate portion 75 that is concentric with the shaft 19 and extends through an angle of about 185°, and the cam has a second arcuate portion 76 concentric with such shaft and which extends through an angle of about 175°. The surface of these cams is engaged by a roller 77 pivotally secured to the outer end of a lever 78 that is supported on a bracket 79 by the pivot pin 80, and this lever is continuously urged towards the cam by a coil spring 81 attached to an extension 82 of the lever. From this extension 82 projects a flexible contact blade 83 adapted to engage an electric contact 84 or 85.

The arrangement is such that when the parts are in the positions shown in Fig. 3 with the roller 77 engaging the curved surface 75 the contact blade 83 will engage the upper contact 84, and when the roller 77 engages the slightly smaller arcuate surface 76 the contact blade 83 will engage the contact 85. The electric connections are such that operating energy will be supplied to the electromagnets in the housing 51 so long as the roller 77 engages the larger arc 75, and electric energy will not be supplied to these magnets as long as the roller 77 engages the smaller arc 76. The cam 71 should be so positioned on the shaft 19 that it bears a definite angular relation to the slotted eccentric 21 and to the eccentric not shown, but which operates within the eccentric head 28 to actuate the cutter, so that the stock S will be fed forward when the cutter is elevated and will not be advanced during the cutting operation. The reason the arc 75 extends through an angle of about 185° is to make sure that the roller 35 will be locked to the gear 50 when this gear comes to a dead stop at each end of the stroke of the gear segment 49. This serves to check the momentum of the roller and stop its rotation.

By employing the operating mechanism described whereby the clutch housing 51 is rocked back and forth by the connecting rod 43 and gear segment 49, these parts will come to a dead stop momentarily as the direction of movement of the gear segment is reversed. This dead stop is utilized very effectively, in accordance with the present invention, to bring the rotation of the feed roller 35 to a dead stop and prevent it from overrunning due to its momentum. The electrical grab coupling herein described produces this desired result by positively locking the disk 52 to the housing 51 throughout the forward stroke of the operating parts and by releasing this clutch throughout the reverse movement of the operating parts. Other types of electric clutches than herein described may be employed, provided they operate to form a positive lock between the gear 50 and roller 35 for the forward stroke of the gear segment 49 and release the roller for the rearward stroke of such segment.

In order to prevent the roller 35 from being accidentally turned when it is released from the housing 51, it is desirable to provide an electrically operated brake which will be applied to hold the roller from rotating when the grab coupling is inoperative, and will be inactive or in the brake-off position when this clutch is active. This is accomplished by employing the construction best shown in Fig. 5 wherein the shaft 53 of the roller 35 is shown as having secured to its opposite end from that which is attached to the disk 52 a brake wheel 86. This wheel is engaged by the flexible brake band 87 one end of which is anchored to a bracket 88 mounted upon a base plate 89 that is bolted to the frame 14. This plate 89 is also provided with in upright post 90 to the upper end of which is pivotally secured a rocking lever 91 that projects over an electromagnet 92, and the outer end of this lever is connected by a member 93 to the free end of the brake band 87. The arrangement is such that when electric energy is supplied to the electromagnet 92, the portion of the lever 91 attached to the brake band will be pulled downwardly to apply the brake. When electric energy is not supplied to this magnet the brake will be released by the action of a coil spring 94 which pulls downwardly on the opposite end of such lever.

The electrical control of the coupling and brake in timed relation with the rotating shaft 19 is secured by wiring the parts as shown in the diagram of Fig. 6, wherein the numeral 95 designates a conventional type of rectifier which is supplied with alternating current such as 115 volts. The lower voltage direct current supplied by this rectifier is under the control of the two-way switch 83, 84, 85. A conductor 96 that is connected to one side of the rectifier through a resistance coil 97 extends to the switch blade 83. The other side of this rectifier has extending therefrom the conductor 98 which is connected to the grab coupling by a conductor 99, and is connected to the electromagnet 92 for the brake by a conductor 100. A condenser 101 is preferably included in a circuit 102 to reduce sparking. The other terminal of the coupling 51 is connected by a conductor 103 and resistance coil 104 to the terminal 84. The other side of the brake electromagnet is connected by a conductor 105 and resistance coil 106 to the terminal 85. It will be seen that by employing the electrical mechanism of Fig. 6, the shaft 19 when rotated will turn the cam 71 to operate the two-way switch that contacts one or the other of the terminals 84, 85. When the switch blade engages the terminal 84 it will operate the grab clutch, and when it engages the terminal 85 it will apply the brake, but the coupling and brake will never operate simultaneously so there is no danger of one opposing the other.

It is found in practice that the apparatus described works very satisfactorily to produce at high speed battery separators such as indicated by B in Fig. 1. These separators having a length of nearly six inches can be cut from the strip S at a speed of approximately 200 separators per minute, and the separators so produced are of uniform length, due to the fact that the intermittent feeding mechanism of the present invention, at this high speed, advances accurately for each cutter stroke just the amount of stock required to cut a separator of the desired length. It will be seen that the daily output of the present machine is very large.

Having thus described my invention, what I claim and desire to protect by Letters Patent is:

1. Apparatus of the class described comprising in combination, power operated reciprocating mechanism, a rotating member, means for intermittently turning said member from said mechanism, including a gear segment connected to said mechanism to be rocked back and forth thereby, a gear that is turned back and forth by the gear segment, an electrically actuated coupling between said gear and member, and electrical means for synchronizing the operation of said coupling to that of said reciprocating mechanism and operable to couple the gear positively to said member throughout the forward movement of the gear segment and to release them throughout the backward movement of such gear segment.

2. Apparatus of the class described comprising in combination, power operated reciprocating mechanism, a rotating member, means for intermittently turning said member from said mechanism, including a gear segment connected to said mechanism to be rocked back and forth thereby, a gear that is turned back and forth by the gear segment, an electrically actuated coupling between said gear and member and having a housing attached to said gear and a separate disk attached to said member, magnetic means in said coupling operable to bring said housing and disk in contact to couple them positively together, and electrical means for synchronizing the operation of said coupling to that of said reciprocating mechanism and operable to couple said housing and disk positively throughout the forward movement of the gear segment and to release them throughout the backward movement of such gear segment.

3. Apparatus of the class described comprising in combination, power operated reciprocating mechanism, a rotating member, means for intermittently turning said member from said mechanism, including a gear segment connected to said mechanism to be rocked back and forth thereby, a gear that is turned back and forth by the gear segment and which comes to rest momentarily as it reverses its direction, an electrically actuated coupling between said gear and member, and electrical means for controlling the coupling so that the gear and member are locked together throughout the forward rotation of the gear and are released throughout the rearward rotation of the gear.

4. Apparatus of the class described comprising in combination, power operated reciprocating mechanism, a rotating member, means for intermittently turning said member from said mechanism, including a gear segment connected to said mechanism to be rocked back and forth thereby, a gear that is turned back and forth by the gear segment, an electrically actuated coupling between said gear and member, electrical means for synchronizing the operation of said coupling to that of said reciprocating mechanism and operable to couple the gear to said member positively throughout the forward movement of the gear segment and to release them throughout the backward movement of such gear segment, and an electrically controlled brake operable to hold said member from turning during the backward movement of the gear segment.

5. Apparatus of the class described comprising in combination, power operated reciprocating mechanism, a rotating feed roller, means for intermittently turning said roller to advance stock step by step to the reciprocating mechanism, including a gear segment associated with said mechanism and rocked back and forth in synchronism with the reciprocating mechanism movement, a gear that is turned back and forth by the gear segment, an electrically actuated coupling between said gear and roller to turn the roller, an electrically operated brake for holding the roller from rotating, and a two-way switch operable when in one position to actuate the clutch to turn said roller and when in the other position to release the clutch and apply the brake.

6. Apparatus for cutting a blank rapidly into sections of uniform length, comprising a power operated reciprocating cutter, a rotating feed roller for feeding the blank intermittently to the cutter, a gear segment associated with the reciprocating cutter and rocked back and forth in synchronism with the cutter movement, a gear that is turned back and forth by the gear segment, an electrically actuated coupling between the gear and roller, and electrical means controlled by means operated in synchronism with the cutter movement to operate the coupling to lock the gear to the roller throughout the forward movement of the gear and to release them throughout the rearward movement of such gear.

7. Apparatus of the class described comprising in combination, power operated reciprocating mechanism, a rotating feed roller, means for intermittently turning said roller to advance stock step by step to the reciprocating mechanism, including a gear segment associated with said mechanism and rocked back and forth in synchronism with the reciprocating mechanism movement so that it comes momentarily to a dead stop at each end of its stroke, and an electrically actuated clutch for turning the roller in one direction from the gear segment and adapted to utilize the dead stop movement of the gear segment to arrest the momentum of the feed roller.

8. Apparatus of the class described comprising in combination, power operated reciprocating mechanism, a rotating member, means for intermittently turning said member from said mechanism, including a gear segment associated with said mechanism and rocked back and forth in synchronism with the reciprocating mechanism movement, a gear that is turned back and forth by the gear segment, a coupler operable to lock said gear to said member, said coupler including a first means fixed for movement with said gear and a second means fixed for movement with said rotating member, coupling means for coupling said first and second means to lock them positively together throughout the forward movement of the gear segment and to release said first and second means throughout the rearward movement of the gear segment, and means operated in synchronism with the movement of said reciprocating mechanism to actuate said coupling means at the dead stop position of the gear segment prior to the forward movement thereof to couple said first and second means together and to release said coupling means at the dead stop position of the gear segment prior to the rearward movement of the gear segment.

9. Apparatus for cutting a blank rapidly into sections of uniform length, comprising a power operated reciprocating cutter, a rotating feed roller for feeding the blank intermittently to the cutter, a gear segment associated with the reciprocating cutter and rocked back and forth in synchronism with the cutter movement, a gear meshing with said gear segment, an electrically actuated coupling between the gear and the roller, a circuit operable to control the coupling to lock the gear to the roller throughout the forward movement of the gear and to release them throughout the rearward movement of the gear, and means operated in synchronism with said reciprocating cutter operable to control said circuit.

References Cited in the file of this patent

UNITED STATES PATENTS

| | | |
|---|---|---|
| 677,518 | Jacobs | July 2, 1901 |
| 678,371 | Bender | July 16, 1901 |
| 1,489,014 | Shellenberger | Apr. 1, 1924 |
| 1,947,015 | Littell | Feb. 13, 1934 |
| 2,066,131 | White | Dec. 29, 1936 |
| 2,188,871 | Broekhuysen | Jan. 30, 1940 |
| 2,304,514 | Sutton | Dec. 8, 1942 |
| 2,359,420 | Herzog | Oct. 3, 1944 |
| 2,648,183 | Dalton | Aug. 11, 1953 |
| 2,652,247 | Kane | Sept. 15, 1953 |